Sept. 13, 1955      F. M. VAN DEVENTER      2,717,758
PLUG VALVES

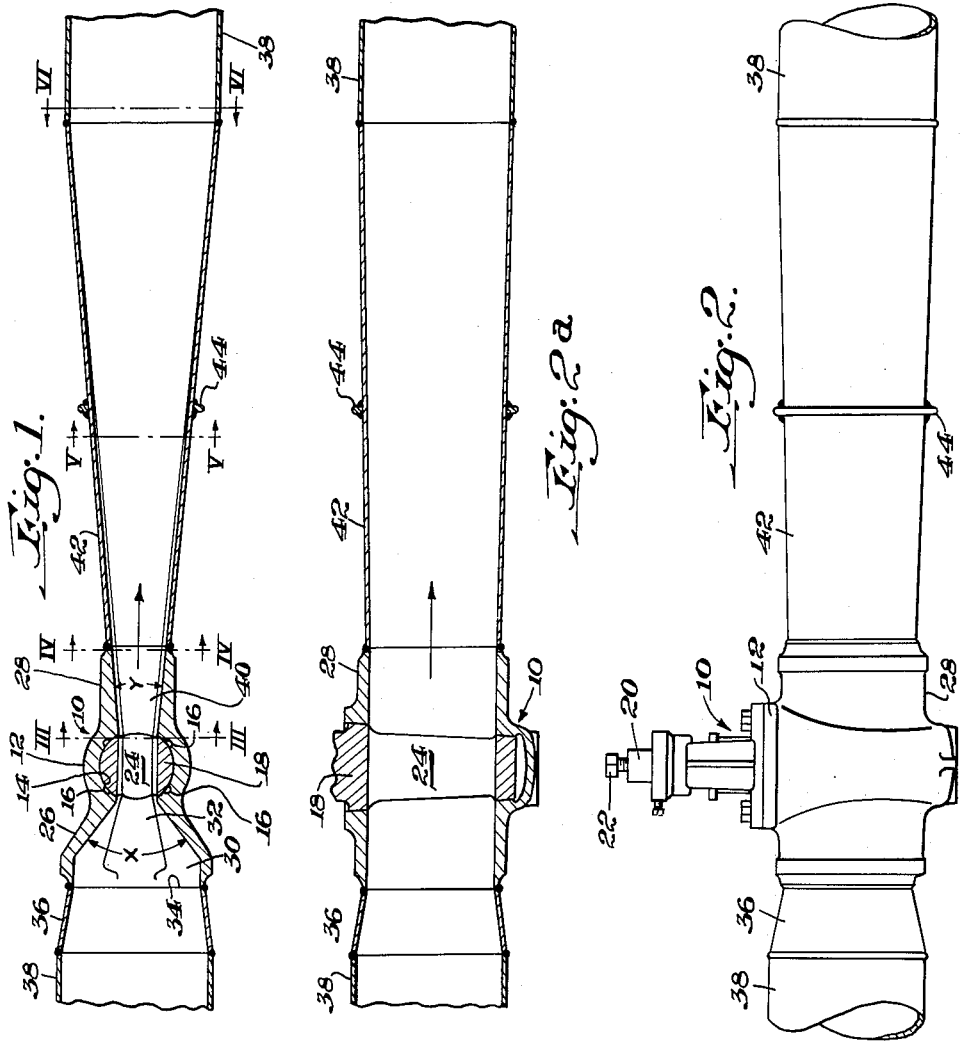

Filed May 4, 1948      2 Sheets-Sheet 2

INVENTOR.
F. M. VAN DEVENTER.
BY Albert J. Henderson
his ATTORNEY.

United States Patent Office 2,717,758
Patented Sept. 13, 1955

2,717,758
PLUG VALVES

Frank M. Van Deventer, Westfield, N. J., assignor, by mesne assignments, to Walworth Company, New York, N. Y., a corporation of Massachusetts Application May 4, 1948, Serial No. 25,002

5 Claims. (Cl. 251—124)

This invention relates to valves and, more particularly, to plug valve assemblies for pressure recovery purposes.

In the conventional design of plug valves, the relatively abrupt enlargement of flow area from the plug to the downstream port of the valve necessarily involves a pressure drop in the fluid being conveyed therethrough. Such pressure drop becomes cumulative in long pipe lines where a multiplicity of plug valves is installed at intervals in the line. This reduces the amount of fluid which can be transported through a given size pipe and necessitates an increase in the power required to force a given quantity of fluid through the line.

The problem has been accentuated over a period of years due to the development of larger and larger pipe lines, particularly for cross-country use. The increased cost of valves comparable in size to such lines has led to the use of smaller valves in an endeavor to reduce the overall capital investment. Consequently, a considerable increase in pressure loss as compared to that through full size valves has been encountered. This has restricted the usefulness of plug valves despite definite advantages which this type of valve possesses; one particular advantage being that plug valves readily lend themselves to the application of lubricating principles which are now embodied in the well-known lubricated plug valve.

An object of this invention is to reduce the pressure loss through plug valves.

Another object of the invention is to permit the use of valves of smaller rated size than the pipe line in which they are installed without undue loss of efficiency, in fact in some cases with increased efficiency.

Another object of the invention is to achieve the desired result without necessitating departure from the conventional form of port opening in plug valves or an increase in the port area.

Another object of the invention is to utilize most effectively the increase in velocity which accompanies pressure drop to produce a pressure recovery.

Another object of the invention is to increase the conversion of velocity into pressure to substantially its highest efficiency.

Another object of the invention is to combine slight structural changes in the plug valve with corresponding changes in the adjacent pipe line section to produce a high overall efficiency.

Other objects and advantages will become apparent from the following description taken in connection with the accompanying drawings wherein:

Fig. 1 is a longitudinal sectional plan view of a plug valve and pipe line assembly embodying the invention.

Fig. 2A is a longitudinal sectional elevation corresponding to Fig. 1.

Fig. 2 is a front elevation corresponding to Fig. 2A.

Figure 3:
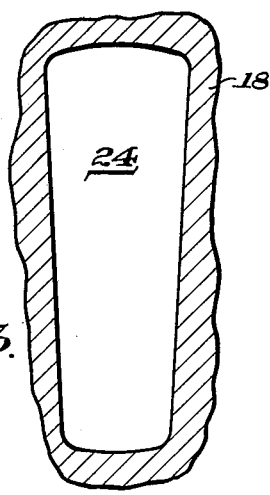
Figs. 3 through 6 are cross-sectional views on lines III—III through VI—VI respectively of Fig. 1 but on an enlarged scale.

Referring more particularly to the drawings, the plug valve element of this invention is shown as comprising a lubricated plug valve 10 of conventional form but modified slightly as will appear hereinafter. The plug valve 10 comprises a casing 12 having a seating surface 14 therein which may be of conical form and provided with lubricating grooves 16 as is customary. A rotatable plug member 18 is positioned in the casing 12 and may be of conical form for cooperation with the seating surface 14.

As shown in Fig. 2, the plug member 18 is provided with a stem 20 by means of which it can be rotated through an angle of approximately 90° defining the open and closed positions of the valve. The usual lubricant compressor screw 22 extends from the stem 20 and can be operated to produce lubricant pressure in the grooves 16 for distribution around the seating surface 14. As the structure and operation of such lubricated plug valve devices is well known, further description is deemed unnecessary.

The plug member 18 is provided with a port 24 extending therethrough and which is of trapezoidal form as indicated in Fig. 3. When the plug member 18 is in the open position shown in Fig. 1, fluid is admitted thereto from an inlet 26 and is conveyed therefrom by an outlet 28 which are positioned respectively on the casing 12 on opposite sides of the plug member 18. In this embodiment of the invention, the inlet 26 is of conventional form and requires no changes to adapt it for accomplishing the principles of the invention. However the outlet 28 is modified from the conventional form and thereby the objects and advantages of this invention are achieved.

Accordingly, the inlet 26 is of hollow, tapered construction having a tapered opening 30 which converges from the outer end of the inlet 26 for registry with the adjacent end of the port 24 in the plug member 18. The included angle "X" of the tapered opening 30 is usually 40 degrees or more and, as will appear hereinafter, is therefore more obtuse than that of the outlet 28. The opening 30 preferably merges from a trapezoidal form at its inner or smaller end conforming to the shape of the port 24 into a substantially circular opening 34 at its outer or larger end as indicated in Fig. 1 of the drawings. The outer end 34 of the inlet 26 is adapted for connection to a pipe section 36 which is of tubular form and, in this instance, is a reducing fitting connected at its opposite end to one end of a pipe line 38.

Since it has become common practice to weld successive sections of pipe lines together, the valves used in such pipe lines are similarly equipped with welding ends so that they also may be welded into the pipe line. Accordingly, the generally circular outer end 34 of the inlet 26 terminates in a welding end portion which is shown as welded to the smaller end of the tubular pipe section 36 and which, in turn has its larger end welded to the pipe 38. As previously mentioned, the inlet 26 is of generally conventional form and consequently an abrupt change from one area to another occurs in the fluid passing from the pipe line 38 through the pipe section 36 and the inlet 26 to the port 24. It will be apparent that when a similar abrupt change occurs in a reverse direction, such as when the fluid emerges from the port 24 into a conventional outlet, there is a considerable restriction of flow area in the central portion of the valve body which bears some resemblance to a Venturi tube. However, only a slight loss occurs in the converging or inlet channel and some of the fluid pressure is converted into velocity of the fluid.

This invention is more particularly concerned with recovery of fluid pressure. It is well known that the effectiveness of reconversion of velocity into pressure in the downstream channel of a Venturi tube depends upon the difference in flow area at the throat as compared to the area at the mouth; but, more importantly, it depends upon the angle between the sides of the flow channel When this angle is 40° or more as in the case of conventional valves, the loss due to turbulence and shock is as great as though the change in section were an "abrupt enlargement," i. e., an immediate change from one area to a larger area. In this invention, certain changes to be described have been made in the outlet port of the otherwise conventional valve but in combination with supplementary structure also to be described. The combination provides a continuous flow channel beginning at the valve plug member 18 of such proportions as to accomplish a highly efficient conversion of the velocity into pressure.

To this end, the outlet 28 of hollow, tapered construction is provided with a tapered opening 40 which diverges from registry with the port 24 and maintains throughout substantially the greater portion of its length the same trapezoidal form as that of the port 24. Consequently, the cross-sectional area at the outer or larger end of the opening 40 more nearly approximates that of the port 24 than does the cross-sectional area at the outer or larger end of the inlet opening 30. Specifically, the included angle "Y" of the opening 40 should be approximately 10° and the highest efficiency is obtained when the included angle "Y" is in the range of 7° as shown in the horizontal section Fig. 1 and 3° in the vertical section shown in Fig. 2A.

Figure 4:
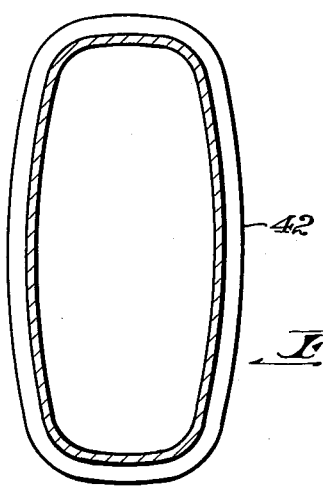
Figure 5:
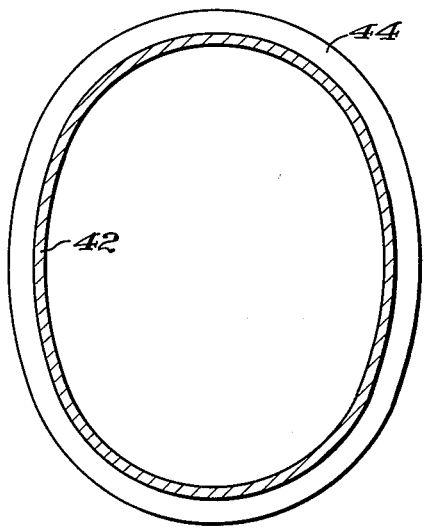
Figure 6:
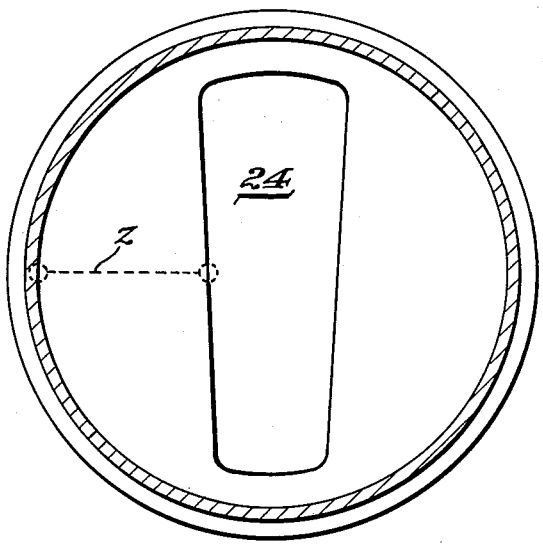

As in the case of the inlet 26, the outlet 28 terminates in a welding end connection which is shown as welded to one end of a tubular pipe section 42. The opposite end of the pipe section 42 is welded to the opposite end of the pipe 38 and hence is formed generally circular in contour. As the precise shape of the pipe section 42 has an important part in accomplishing the features of this invention, it will now be more particularly described in connection with Figs. 4, 5 and 6 showing sectional views taken at various points along the pipe section 42.

As will be apparent from the longitudinal sectional views of Figs. 2 and 2A, the pipe section 42 forms an elongated channel generally resembling a frustum of a cone. At its inlet or smaller end, the cross-section of the pipe section 42 is of somewhat trapezoidal form as shown in Fig. 4. At an intermediate point between the smaller and larger ends, as indicated in the sectional view Fig. 5, the contour of the pipe section 42 varies between a circle and a trapezoid and is in the nature of an ellipse. Specifically, the contour of the pipe section 42 is described by a series of straight lines connecting homologous points on the periphery of the port 24 and the substantially circular opening in the pipe 38 as indicated by the broken line "Z" in Fig. 6. Such a straight line "Z" will touch the inner wall of the pipe section 42 and the outlet opening 40 substantially throughout the length of such line "Z." The length of the pipe section 42 is determined so as to provide a minimum angle corresponding to the optimum included angle "Y" of the opening 40.

A reinforcing collar 44 is shown positioned intermediate the ends of the pipe section 42 and may be welded thereto as indicated in the drawing. Since internal pressure acting on the Bourdon principle would tend to distort the pipe section 42 at the point shown and at related points, such reinforcing collar 44 may be advantageous in use.

As will be apparent, the pipe line 38 has a cross-sectional area substantially in excess of that of the port 24 or even of the inlet opening 30 at the outer end 34 thereof. Since one of the important advantages of the invention is that it permits the economical use of valves of smaller size than the pipe, such reduction in cross-sectional area may be intentional. For example, with a thirty-inch diameter pipe line 38 there could be used a valve with 26 inch diameter welding ends and a standard so-called 24 inch plug member 18. In such event, the length of the pipe section 42 would be approximately 112 inches to provide the necessary minimum included angle as described. For smaller valves and pipe line constructions, the pipe section 42 could be produced by casting in steel or other materials, whereas for the larger sizes such as disclosed herein it could well be fabricated from plate stock, such as rolled steel material. It will be understood that valves with one or more flanged ends for bolting to the pipe line could equally well be used in place of the welding end valve shown and described herein. These and other modifications and changes in the arrangement and combination of parts and in the details of construction can be made without departure from the scope of the invention as defined in the appended claims.

I claim:

1. A plug valve assembly adapted for insertion between the ends of a pair of oppositely disposed tubular pipe sections comprising a valve casing having opposite end portions, one of said casing portions defining an inlet passage converging in one direction to a tapered valve seat from substantially the diameter of one of the pipe sections with which it is adapted to be associated, the other of said casing portions including an outlet passage extending in an opposite direction from the valve seat, a tapered plug valve member cooperable with said seat and having a port of substantially rectangular cross-section, said passages having at least the portions thereof adjacent the valve seat formed of substantially rectangular cross-section with which said plug port is adapted to register to form a supplemental connecting conduit in the open position of said valve member, and a tapered pipe section positioned at the outlet of said outlet passage and engaging at its smaller end with said other casing portion, said smaller end being of generally rectangular cross-section forming a continuation of said outlet passage and diverging into substantially circular cross-section at its larger end, said tapered pipe section having an included angle in its major dimension of approximately ten degrees and being adapted to be connected at the larger end thereof to the other of the tubular pipe sections.

2. A plug valve assembly as claimed in claim 1 wherein said outlet passage diverges to the terminus of said other casing portion and terminates in an outlet port of generally rectangular cross-section having a cross-sectional area substantially less than the cross-sectional area of the other of the pipe sections.

3. The structure set forth in claim 2 wherein the arrangement is such that a straight line connecting homologous points on the peripheries of said outlet port and the circular opening in said tapered pipe section respectively will touch the inner wall of said tapered pipe section and said outlet passage substantially throughout the length of said line.

4. The structure claimed in claim 3 wherein means is provided for connecting said tapered pipe section to said casing.

5. A plug valve assembly as claimed in claim 4 wherein means is provided for reinforcing said tapered pipe section to preclude distortion thereof.

References Cited in the file of this patent

UNITED STATES PATENTS

| | | |
|---|---|---|
| 205,267 | Hayden | June 25, 1878 |
| 842,393 | De Ferranti | Jan. 29, 1907 |
| 1,220,773 | Murray | Mar. 27, 1917 |
| 1,522,490 | Borden | Jan. 13, 1925 |
| 1,696,726 | Nordstrom | Dec. 25, 1928 |
| 2,414,751 | Ludeman | Jan. 21, 1947 |
| 2,421,879 | Hamer | June 10, 1947 |

FOREIGN PATENTS

| | | |
|---|---|---|
| 422,829 | France | 1911 |
| 339,889 | Great Britain | Dec. 18, 1930 |

OTHER REFERENCES

Merco-Nordstrom Valve Co., Catalog Number 7. Copyright November 1929, pp. 44 and 107. (Copy in Division 39.)

Text on Hydraulics, by Hughes and Safford, MacMillan Co. Copyright 1926, pp. 225 and 227. (Copy in Div. 39.)